March 4, 1969 U. POULSEN 3,431,158
WORKING PROCEDURE OF AND APPARATUS FOR THE MANUFACTURE
OF REINFORCED PLASTIC TUBES
Filed Sept. 22, 1965
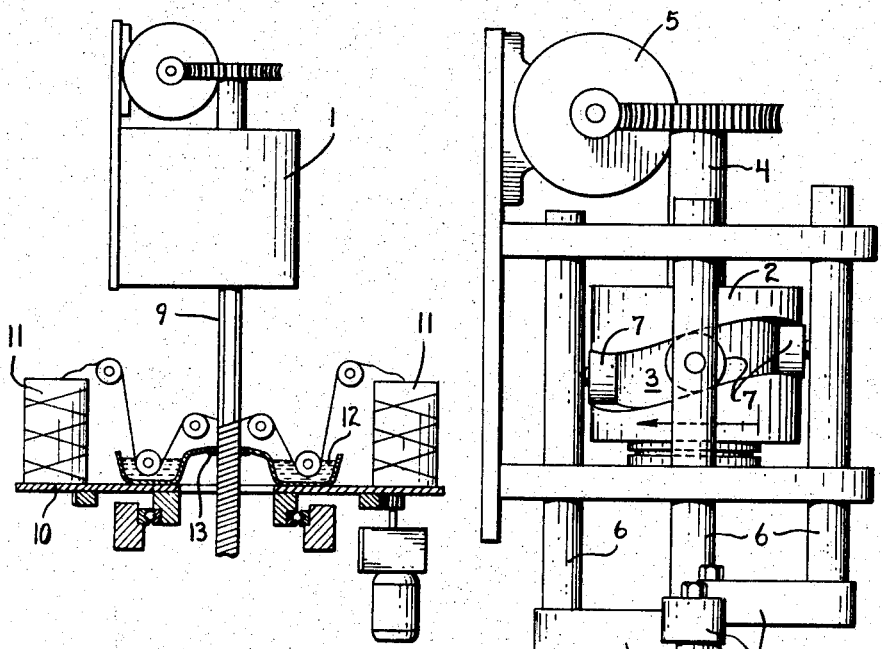
Fig.1.
Fig.2.
INVENTOR.
ULRIK POULSEN
Attorneys

United States Patent Office 3,431,158
Patented Mar. 4, 1969

3,431,158
WORKING PROCEDURE OF AND APPARATUS FOR THE MANUFACTURE OF REINFORCED PLASTIC TUBES
Ulrik Poulsen, Parkvej 28, Virum, Denmark
Filed Sept. 22, 1965, Ser. No. 489,316
U.S. Cl. 156—173                        4 Claims
Int. Cl. B31c 3/00; B65h 54/00

ABSTRACT OF THE DISCLOSURE

A longitudinally divided mandrel with a drive cam and individual cam followers connected to each of the mandrel sections for advancing the majority of sections together to carry tubing formed thereon, while withdrawing fewer mandrel sections rapidly to a starting position to again proceed forwardly with other mandrel sections and continue transportation of the formed tubing.

Background of the invention

This invention relates to the manufacture of glass fibre reinforced plastic tubes and an apparatus for carrying out the method.

Heretofore, reinforced plastic tubes have usually been made by wrapping the reinforcing materials onto a mandrel while simultaneously impregnating them with suitable resins. The tubes have then been cured in an oven or by means of infra-heaters and finally the mandrels have been pulled out for repeated use and the finished pipe lengths trimmed and stocked. Because this procedure is rather labor demanding various attempts have been spent in order to provide for a continuous process which could be fully or partly automatized. One of the chief difficulties thereof is the continuous moving of the product along the mandrel because most resins contract in curing thus raising the pulling forces necessary. Another obstacle is the wound but yet uncured tube in the starting end of the mandrel which is likely to be destroyed during the moving.

In one method heretofore employed in making reinforced plastic pipes a hollow cylindrical mandrel is used, which is extended through the curing zone and stepped in such manner, that the still uncured pipe before entering the heated zone is moved out of its supported engagement with the mandrel as the diameter of the latter is diminished at this point, and simultaneously subjecting the inner surface of the product to air or other fluid under pressure in order to maintain its tubular configuration while passing the curing zone. The free end of the mandrel is provided with a piston fitting tightly into the hardened tube thus closing the pressurized chamber downwardly. In this way most of the curing process is carried out while the pipe is supported and its true cylindrical configuration maintained only by the internal pressurized fluid, and the moving along the mandrel may take place reliably by rollers or other driven pulling mechanism gripping the pipe where it is coming out of the heated zone. However, the method described is beset with a number of drawbacks, and for instance only cylindrical pipes may be produced in this way as all other shapes will be distorted by the internal pressure. Another point is the considerable gripping forces which has to be applied by the moving mechanism for delivering the necessary pull which often impede the manufacture of thin-walled articles.

It is the primary object of the present invention to meet and overcome the aforementioned difficulties by providing a construction and arrangement of parts which move the reinforced plastic pipe continually along a mandrel during its manufacture.

It is a further object of the present invention to provide a construction and arrangement of parts whereby tubes of all shapes and wall thicknesses can be made without the aforementioned difficulties.

The full nature of the invention will be understood from the accompanying drawings and the following description and claims:

FIG. 1 is a side elevation view of the invention with parts broken away.

FIG. 2 is a side elevation view of a portion of the invention shown in FIG. 1 with portions of the housing removed to reveal the shifting mechanism of the invention.

In the drawings the housing for the shifting mechanism is shown generally at 1 in FIG. 1. The housing is removed in the FIG. 2 drawing for clarity, revealing the cylindrical body 2 which has milled about its periphery a track 3. This track follows a screw-line with constant increase for three-quarters of the circumference or periphery of the cylinder. In the last quarter, however, the track follows or defines a screw-line whose increase is three times as great as the aforementioned screw-line of constant increase, as a result of which the track leads back to itself. That is to say, as a result of this construction a track is formed completely around the circumference or periphery of the cylinder. In FIG. 2 of the drawings the track visible to the viewer is that portion whose rate of increase is three times as great as the other portion of the track which for three-quarters of the circumference of the cylinder follows a screw-line of constant increase.

The cylindrical body 2 is mounted on the axle 4 and is capable of rotation in the direction of the arrow by the motor 5. Formed symmetrically about the body and in spaced relation thereto are the four axially shiftable bars 6, of which one is hidden behind the mechanism in the FIG. 2 drawing. These bars extend in a plane parallel to the axis of the cylindrical body.

Each bar is provided with a roller 7 which is seated within the track. During rotation of the cylindrical body each of the four bars 6 is separately reciprocated, in a phase, 90°. By means of connecting pieces 8, each of the four bars is joined to one of the four parts of the mandrel 9.

As is apparent from the foregoing description, each of the four parts of the mandrel is moved alternately slowly downward and quickly upward to its starting position in such a way that the downward speed is constant within a period corresponding with at least three-quarters of the time. The upward movement of each part of the mandrel occurs in the last quarter of the cycle. As is evident, this reciprocating or oscillating movement is carried out by each of the four parts of the mandrel which are reciprocally shifted 90° so that at least three parts are being moved downwardly with the same speed while the fourth part is being drawn quickly upwardly.

Below the shifting mechanism (see FIG. 1) are located several stationary and rotating platforms. These carry the reinforcement and impregnation material. For purposes of illustration only one of these platforms is shown at 10, it having mounted thereon the two coils 11 from which the glass fibers are pulled through the ring-shaped impregnation vessels 12, after which they are wound by a combination of the rotation of the platform and the vertical shifting of the product and the mandrel. The inner layer of the product is formed this way while the surplus impregnation material is scraped off by a scraper-ring 13 and runs back into the vessel 12. Still supported by the mandrel the product passes in this way other platforms and is thereby provided with several layers of reinforcement material.

It is apparent from the foregoing description that the reinforcement material which is being built up around the mandrel and impregnated, will always follow the three parts of the mandrel that at a given moment move downward together. In short, because of the greater friction the product is always going to follow the three parts of the mandrel while the fourth part is returning. The product is thus moved along the mandrel with constant velocity without being exposed to pulling or squeezing forces of any external moving mechanism. This is because the downward speed of each of the three parts is constant within at least 75% of the cycle and the uniform cycles of each of the parts are displaced 90° in relation to one another.

After the desired wall thickness is achieved the product reaches the hardening oven shown generally at 14, and the length of the mandrel is adjusted so that the tube, i.e., the product, leaves it only when it is sufficiently hardened.

It is understood, of course, that the above described procedure may be varied in several ways. For example, the mandrel may be divided into three, five or more parts instead of the four described. Similarly the shifting pattern may be altered for a single part and more than one part may be moved upward simultaneously. The speed of the movement may be varied as desired, provided however, it exceeds the elastic deformation of the product. Still further, the method and apparatus may be applied without essential alterations to other impregnation and reinforcement materials than plastic tubes.

The instant method and apparatus may also be advantageously applied in the preparation of homogenous materials as for example p.t.f.e. which cannot be extruded by ordinary methods. Solid products may be produced in a tube which is divided up and arranged in the described manner. The movement of the products through a hardening and sinter zone may thereby take place without the product being exposed to the aforementioned deforming which results from external pulling power.

It is, therefore, apparent that through the use of a mandrel which is divided lengthwise into three, four or more parts and shifted relative to each other by hydraulic or mechanical apparatus, it becomes unnecessary to use the external pulling-off mechanism employed by the prior art. It is also apparent that a mandrel divided into four parts as described herein will be most practical in that it is applicable to most cross sections. A mandrel for production of square tubes may be produced by four bars with a suitable rectangular cross section just as a mandrel for production of cylindrical tubes may be produced by four bars with suitable cross section. In order to reduce friction the four parts (or other number of parts, as the case may be) may be suitably polished and chrome plated.

The invention claimed is:
1. Method for production of tubes of the kind where the tube forming material is built up on a mandrel and hardened, said method being characterized by the steps of: providing a mandrel divided lengthwise into at least three parts; shifting said parts along the axis of said mandrel forward and back around the same starting position to provide cycles of movement, one cycle for each of said parts; phasing said cycles to cause at least two of said parts to always go forward together and the remaining, lesser number to be simultaneously withdrawn relatively quicker, while said material is built up on the mandrel to form a tube, said cyclical movement of said parts advancing said tube along said mandrel.

2. Method of claim 1 and further characterized by the build-up of the product and transport of the built up material on said mandrel through a hardening apparatus.

3. In a tube forming apparatus, the combination comprising: a body turnable round an axis and having thereon a circumferential track which along more than half of the circumference follows a screw-line with constant increase, but along the last part of the circumference follows a screw-line in the opposite direction with larger increase so that the track leads back to itself; and a number of shiftable bars placed round the body parallel with said axis, each bar being provided with a track follower member received by said track, each of said bars being joined with a different one of a plurality of elongated forming members, said follower members being arranged around said track for movement of a majority of said forming members substantially uniformly forward together along said axis and simultaneous movement of a minority more rapidly back along said axis toward a starting position during rotation of said body round said axis.

4. The combination of claim 3 wherein, said forming members are elongated parts of a mandrel.

References Cited

UNITED STATES PATENTS

| | | | |
|---|---|---|---|
| 2,475,019 | 7/1949 | Faris | 156—173 |
| 3,068,513 | 12/1962 | Chaffin | 264—127 |
| 3,084,087 | 4/1963 | Weil et al. | 156—173 X |
| 3,283,050 | 11/1966 | Boggs | 264—174 X |
| 3,306,797 | 2/1967 | Boggs | 264—137 X |

ROBERT F. WHITE, *Primary Examiner.*

T. J. CARVIS, *Assistant Examiner.*

U.S. Cl. X.R.

18—4; 156—180, 433, 443; 242—7; 264—127, 137, 173